3,425,321
SINGLE ACTION HYDRAULIC ASSISTANCE
DEVICES
Rene Lucien, 56 Blvd. Maillot, Neuilly-sur-Seine, France, and Yves Pascal, 51 Rue Perier, Montrouge, Hauts-de-Seine, France
Filed July 9, 1965, Ser. No. 470,830
Claims priority, application France, July 10, 1964, 981,562; May 11, 1965, 16,518
U.S. Cl. 91—49           3 Claims
Int. Cl. F15b 13/042, 11/08; F01b 15/00

ABSTRACT OF THE DISCLOSURE

A hydraulic assistance device in which a piston is in a jack body and one is fixed, and the other is movable and connected to a member to be actuated, the piston and jack body defining a working chamber coupled to a source of pressure fluid and connected via an orifice to an evacuation chamber leading to exhaust, a freely displaceable ball valve being positioned adjacent the orifice and acted on by a rocker-arm operated by a control member to directly control the position of the ball relative to the orifice and thereby the pressure of the fluid in the working chamber.

---

When the movement of mechanical members necessitates the use of forces which are too great to permit direct operation by human means—or only permitting this at the cost of excessive fatigue—use is made of servo-control devices.

These devices, interposed on the path of the control, have for their essential object to reduce the force to be supplied, but in addition they must provide for the operator an identical travel of operation and a similar sensation, although less accentuated, to that which would be experienced with an unassisted operation.

The hydraulic devices forming the object of the present invention satisfy these essential requirements, and permit the pressure of operation to be adjusted while limiting the force applied to the member to be controlled to a maximum compatible with the satisfactory performance of the mechanism.

The devices in accordance with the invention are essentially characterized in that the action of the operator causes the closure of a valve controlling the output of fluid from the chamber of a jack, the loss of pressure thus created causing an increase of pressure in the said chamber and thereby causing the movement of that of the elements of the jack which is coupled to the device to be controlled, this movement having the same value and being effected in the same direction as the movement imparted to the control member by the operator.

In a first embodiment of the invention, the operation of the device is effected by tractive pull on the control member and the device acts by tractive pull on the member to be controlled.

In accordance with this embodiment, the piston rod of the jack is coupled to a fixed point and the body of the jack is coupled to the member to be controlled, while the control rod passes through the piston and is provided at its extremity with a rocker-arm acting on a ball forming a control valve for the outlet of fluid, a suitably pre-stressed spring being applied to the rocker-arm in such manner that the latter acts on the ball in opposition to the pressure applied to the ball by the fluid.

In a second embodiment of the invention, the control of the device is effected by thrust on the control member and the device acts by tractive pull on the member to be controlled.

In accordance with this second embodiment of the invention, the body of the jack is coupled to a fixed point, while the piston is coupled to the member to be controlled. The control rod passes through the bottom of the jack body and is provided at its extremity with a rocker-arm articulated on one face of the piston and acting on a ball controlling the rate of flow of fluid at the outlet of a passage formed in the piston and opening into a working chamber, the piston being coupled on its other face in any appropriate manner to the member to be operated.

The invention is further described below with reference to the accompanying drawings, in which.

Figure 1:
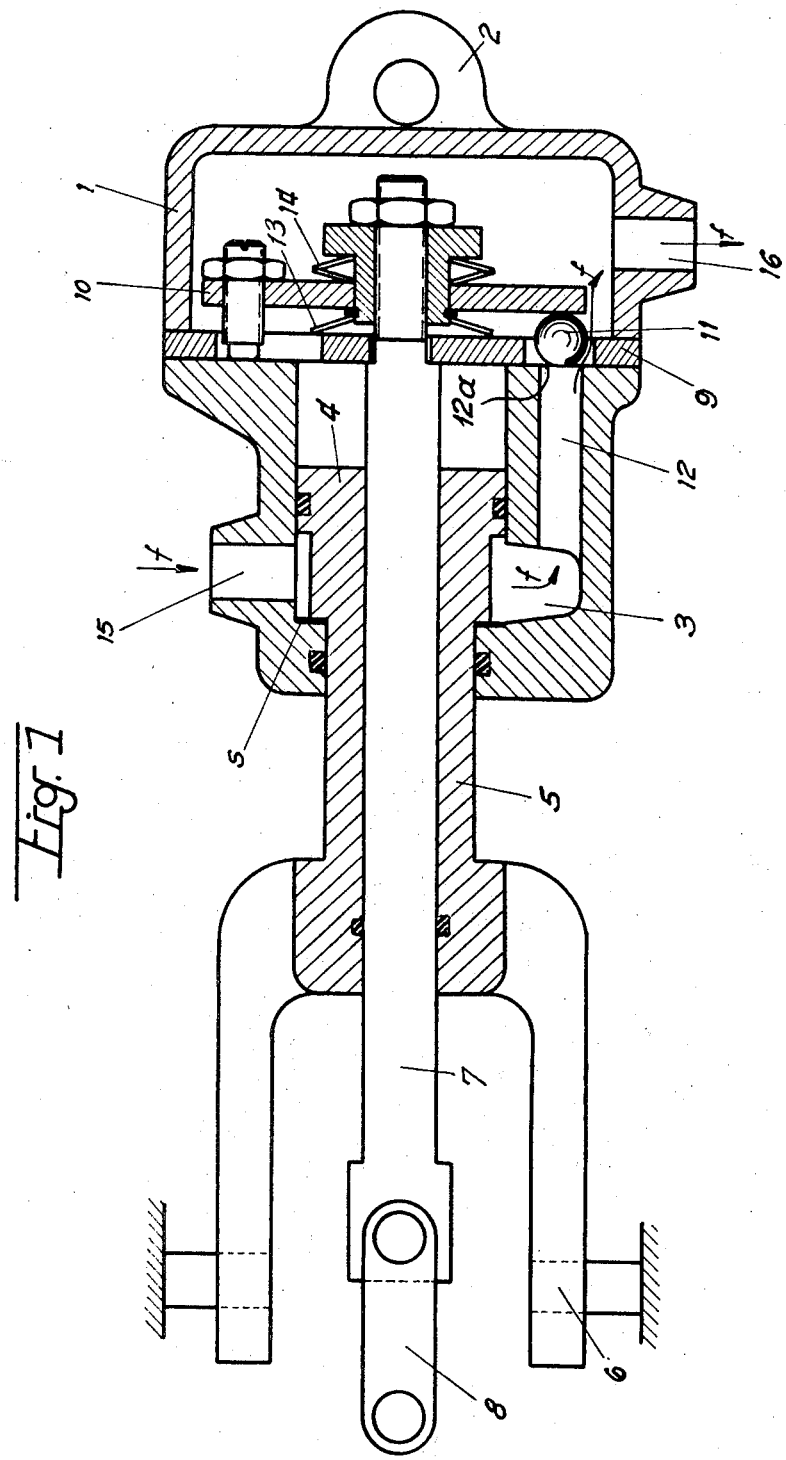
FIG. 1 is a view in longitudinal section of the device according to the first embodiment of the invention, at rest.

With reference to FIG. 1, the device comprises a jack body 1 coupled to the member to be operated by a fork 2. In the chamber 3 of the jack slides a piston 4, the rod 5 of which is coupled at 6 to a fixed point. The control rod 7 is coupled to the lever 8 which is actuated directly or indirectly by the operator. This rod passes through the piston 4 and also through a partition 9 formed in the body of the jack and is provided at its extremity with a rocker-arm 10 articulated on the said partition at one of its extremities while the other extremity acts on a ball 11 seated in an orifice 12a of a conduit 12 opening into the chamber 3.

An elastic washer 13 is arranged between the partition 9 and the rocker-arm 10, and two elastic washers 14 are arranged between the latter and a shoulder on the extremity of the rod 7.

A conduit 15 supplies fluid from the pump (not shown) to the chamber 3 and a conduit 16 leads it back to the tank (not shown) after it has passed through the orifice 12 in the direction of the arrows $f$.

The various conduits to which the fluid is conveyed are such that, in the position of rest illustrated in FIG. 1, the hydraulic pressure existing in the chamber of the jack is sufficiently low so as not to cause any undesirable force on the member to be operated.

Figure 2:
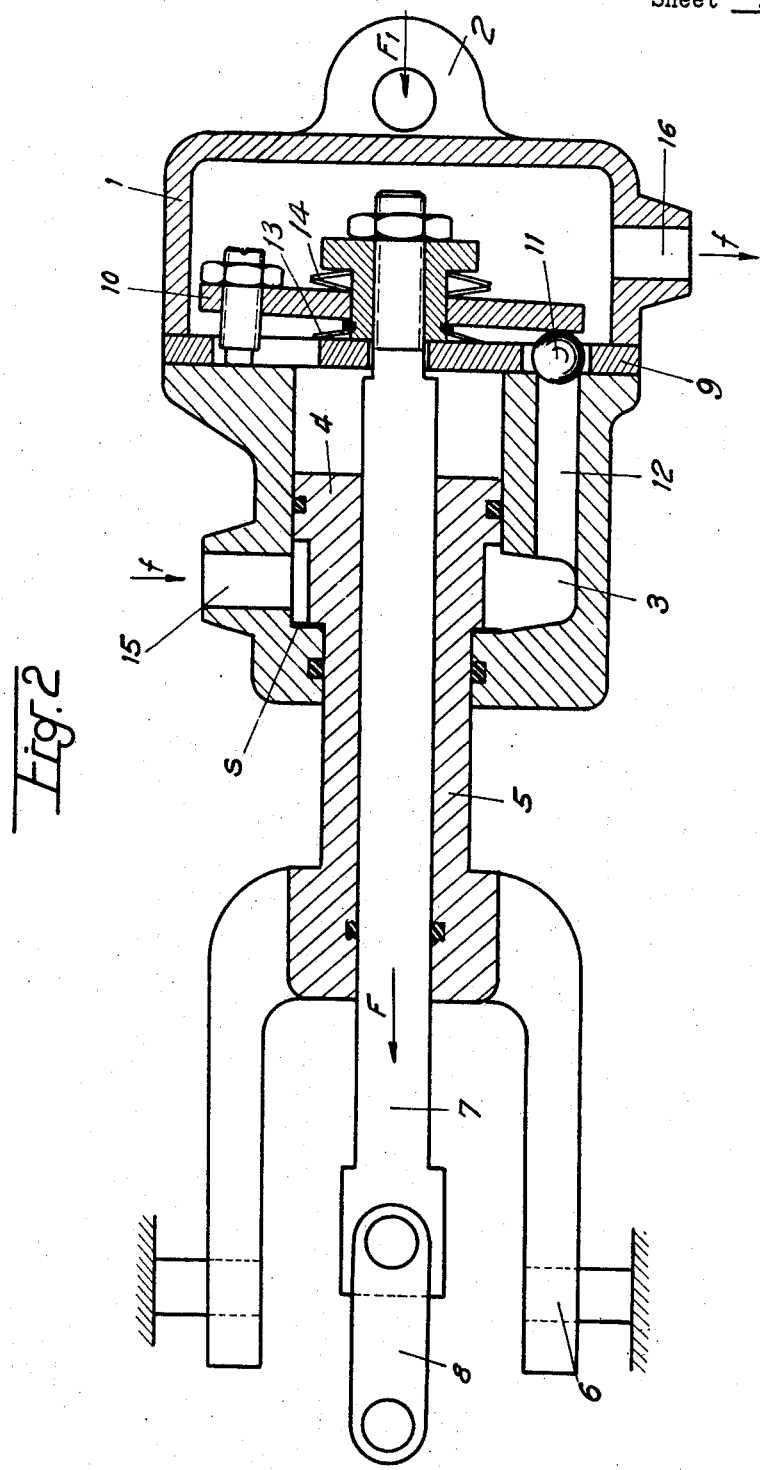
FIG. 2 is a view of the same device in course of operation.

The operation of the device is as follows (see FIG. 2).

When the operator actuates the control 8 and in consequence the rod 7 in the direction of the arrow F, the rocker-arm 10 pivots and compresses the elastic washer 13, pushing back the ball 11 which then closes the orifice 12. The elastic washer 13 which ensures the freedom of the ball 11 in the position of rest is chosen as a function of the operation which the device is to carry out in such manner as to define the threshold effort desired.

The ball 11 having closed the orifice 12, the pressure drop thus created causes the pressure to rise in the chamber 3 of the jack. For this reason, a force F1 is applied on the annular section S and is transmitted through the extremity of the jack body and the fork 2, to the member to be operated. This latter moves forward in consequence in the same direction and by the same amount as the control rod 7, the assembly then remaining in equilibrium under the conjoint action of the pressure existing in the jack and the reaction due to the member to be operated. The force which must then be applied by the operator on the control 8 must only compensate for the action of the pressure on the ball 11 and is therefore relatively small.

Figure 3:
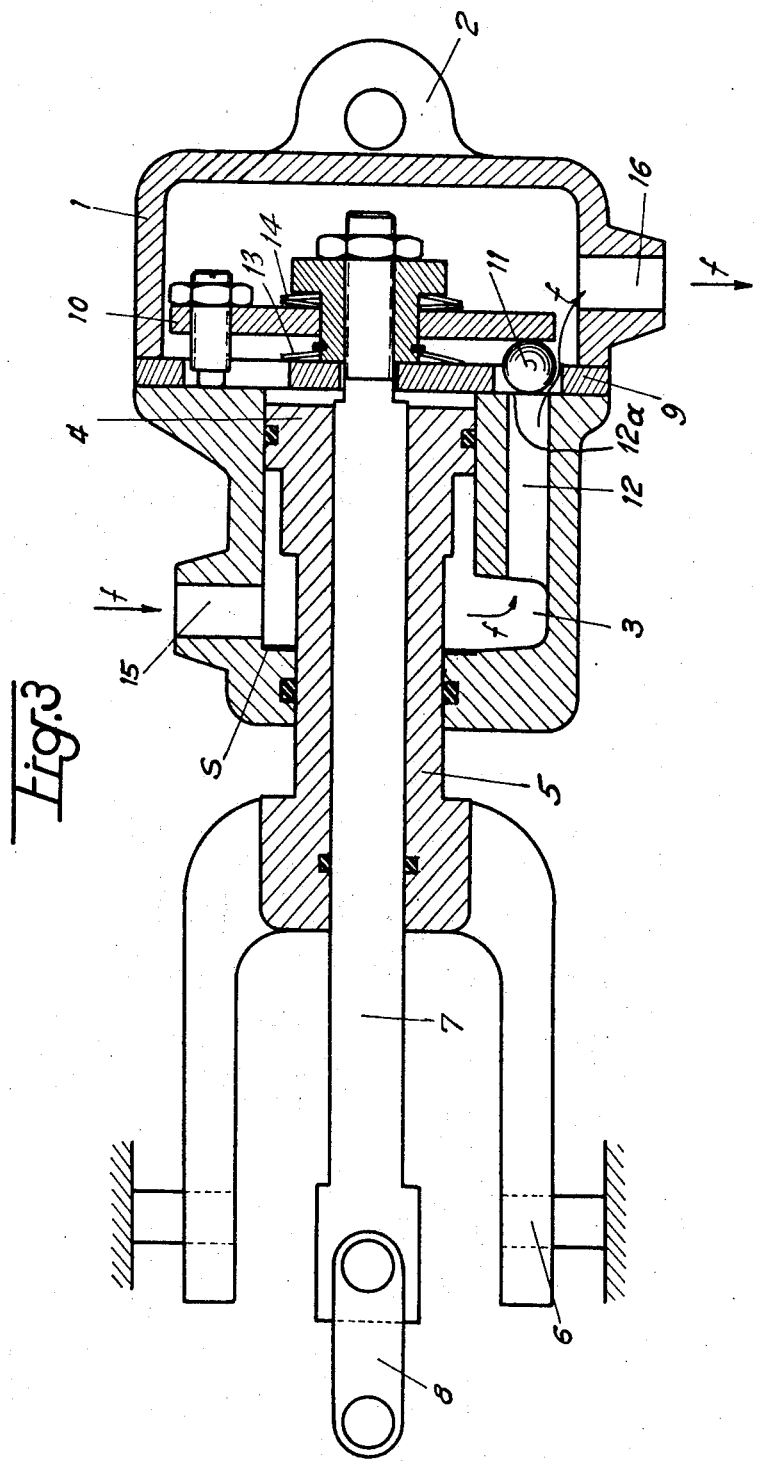
FIG. 3 is a view of the same device, showing the working of the safety mechanism which limits the force applied to the member to be operated.

If the operator applies an excessive force to the control 8, which is not compatible with the correct performance of the entire mechanism, the ball 11, under the action of the pressure which then exists in the chamber 3, pushes back the rocker-arm in spite of the opposite force of the washer 14, and, moving away from the orifice 12, permits the fluid to escape towards the tank (see FIG. 3).

The washers 14 are subjected during assembly to a pre-stress such that they can only be compressed when the pressure in the jack reaches an excessive value.

It can be seen that the device which has just been described acts as a follow-up control, and only requires a small effort from the operator, proportional to the force applied to the member to be operated. Furthermore, the maximum-force limiter with which it is provided is particularly simple.

Figure 4:
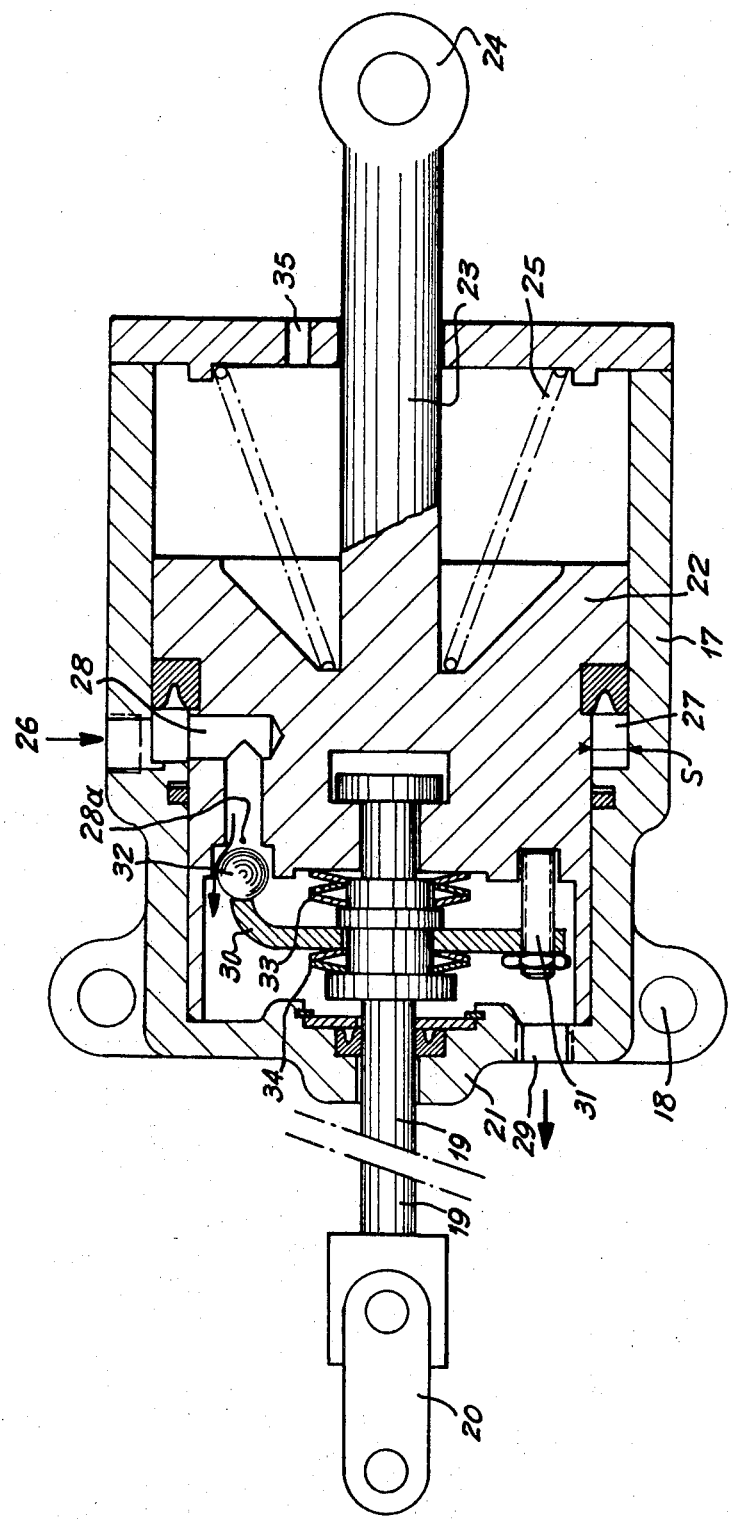
FIG. 4 is a view in longitudinal cross-section of the device according to the second embodiment of the invention, at rest.

Referring now to FIG. 4, the device comprises a jack body 17 coupled to a fixed point 18 of the mechanism. A control rod 19, coupled to the manual control 20, actuated by the operator, passes through the bottom 21 of the jack body and is coupled, with a certain longitudinal play, to the piston 22. The latter is extended by a rod 23 articulated at 24 to the member to be operated. The rod 23 can be replaced by a push-rod or by any other suitable coupling means. A restoring spring 25 is arranged between the piston and the bottom of the jack body. The spring may be dispensed with in the case where the member to be operated itself develops a restoring force sufficient to return the piston 22 to its position of rest.

The control fluid passes through the orifice 26 into a working chamber 27 and then passes through the piston 22 via passage 28 and returns to the tank through the orifice 29.

The working section of the piston 22 is the annular section S.

As in the device previously described, the extremity of the control rod 19 is provided with a rocker-arm 30 articulated at 31 on the piston 22, and the other extremity of which acts on a ball 32 seated in an orifice 28a of the passage 28.

Elastic washers 33 and 34, or any other members forming a spring, are arranged respectively between the piston and the rocker-arm and between this latter and a shoulder on the rod 19.

The various sections of passage of the liquid are dimensioned in such manner that, in the position of rest shown in FIG. 4, the hydraulic pressure does not produce any undesirable force on the piston of the jack.

Figure 5:
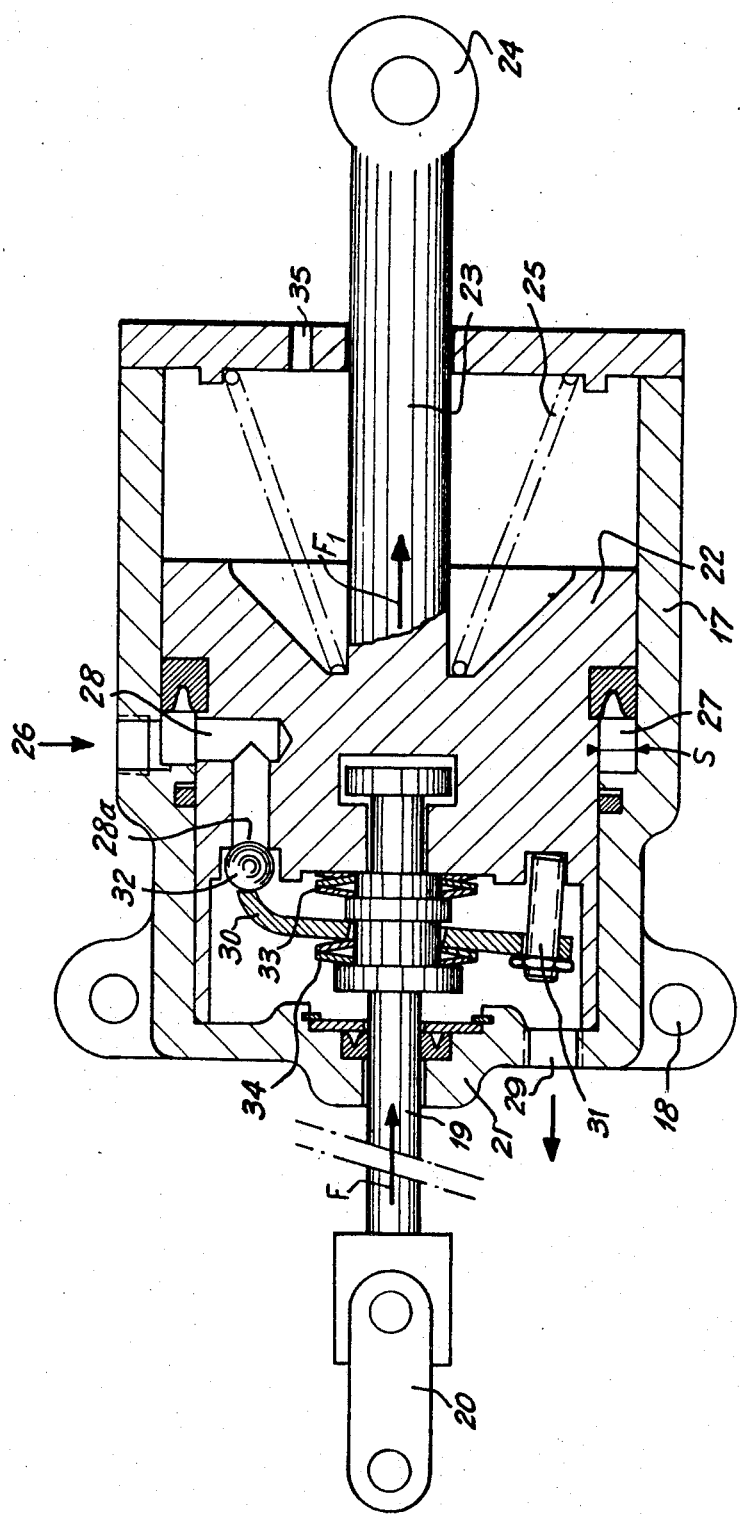
FIG. 5 is a view of the same device during the course of operation.

When the operator actuates the control 20 and in consequence the rod 19, in the direction of the arrow F (see FIG. 5), the rocker-arm 30 pivots to compress the washers 33 and pushes back the ball 32 which then closes the orifice 28a (FIG. 5).

The value of the spring constituted in the selected example by the washers 33, which ensure the freeing of the ball at rest, is chosen as a function of the applications, so as to define the desired threshold effort.

The ball 32 having closed the orifice 28a, the pressure drop thus created causes the pressure to rise inside the chamber 27. For this reason, a force F1 is applied on the annular section S and is transmitted by the piston 22 and the rod 23 to the member to be operated. The latter consequently moves forward in the same direction and by the same amount as the control rod 19, the whole unit then remaining in equilibrium under the conjoint action of the pressure existing in the jack and the opposite reaction due to the member to be operated. The force which the operator must then apply to the control 20 need therefore only compensate for the force of the pressure on the ball 32, which effort is transmitted to it by the rocker-arm 30.

Figure 6:
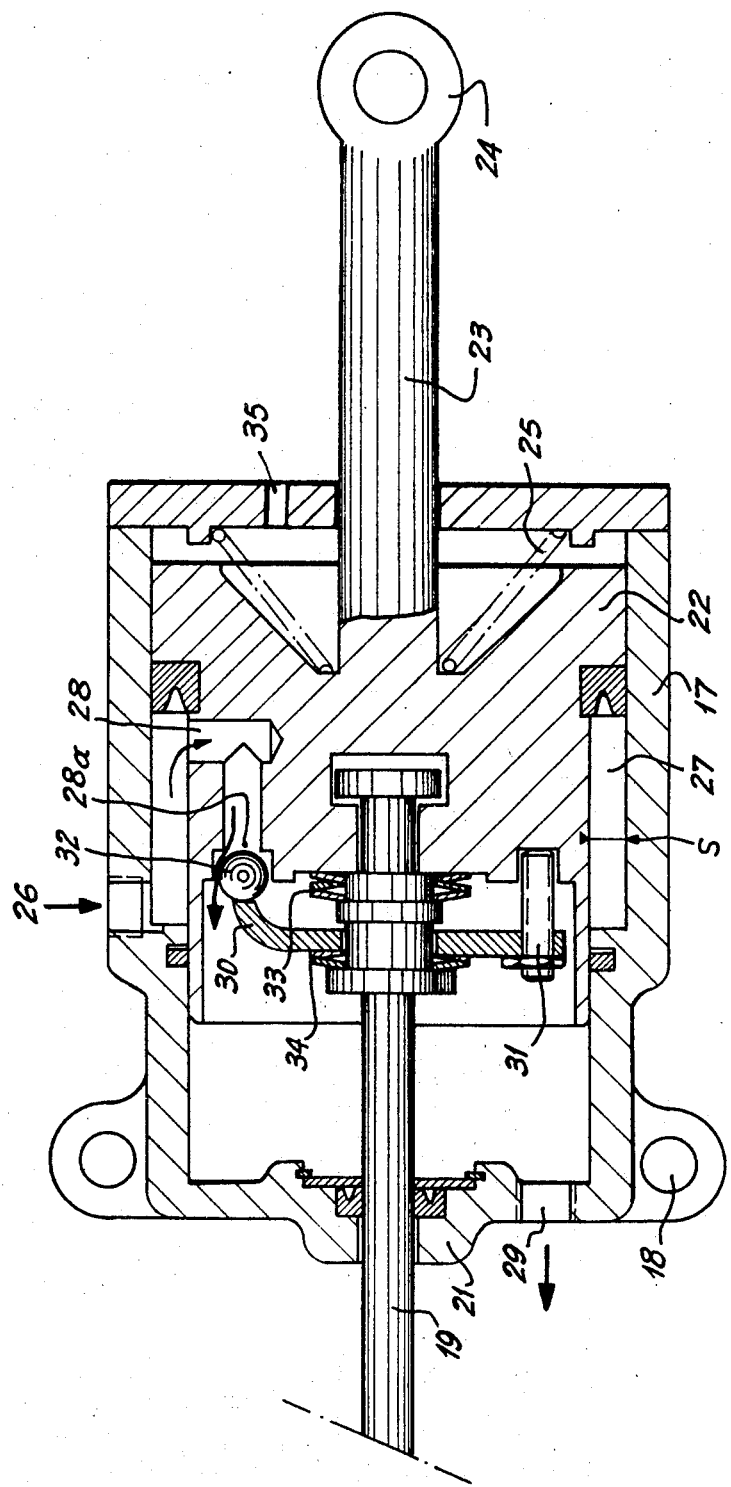
FIG. 6 is a view of the same device showing the operation of the safety mechanism which limits the force applied to the member to be operated.

If the operator applies to the control 19 a force which, when amplified by the assistance device, would be likely to affect the correct performance of the entire mechanism, the ball 32 then plays the part of a pressure-relief valve, limiting the value of the pressure to a pre-determined threshold value. Under the action of the pressure existing in the chamber 27, the ball 32 pushes back the rocker-arm 30 in spite of the opposing force of the washers 34, and, by opening the orifice 28a, permits the fluid to escape towards the tank (see FIG. 6). The washers 34 are given a pre-stress during assembly such that they can only be compressed when the pressure in the jack reaches an excessive value.

A decompression orifice 35 is provided in the jack body so as to permit the admission of atmospheric pressure.

The device which has just been described has the same general characteristics as the device of the first emodiment, since it acts as a follow-up control and requires only a small force from the operator, proportional to the effort applied to the member to be operated. As in the first form of embodiment, a single valve serves as a control valve and as a safety valve. However, it can be seen that in the device according to the present form of construction, the action on the control is effected by a thrust and results in a thrust on the member to be operated.

It will of course be understood that the invention is not limited to the forms of embodiment described, and modifications may be made to the devices without thereby departing from the scope of the invention. Thus, the washers may be replaced by springs, the fork by any suitable coupling arrangement, and the ball by a valve or a clapper carrying out an equivalent action.

What is claimed is:

1. A hydraulic assistance device interposed between a source of pressure fluid and a member to be actuated, said device comprising; a displaceable control member, a jack body member, a piston member in the jack body member, one of said members being fixed and the other adapted for connection with the member to be actuated, said control member and piston member being engaged together for substantially common displacement, said jack body member and piston member defining a working chamber therebetween coupled to a source of pressure fluid, said jack body member defining an evacuation chamber coupled to exhaust for the pressure fluid, means defining an orifice providing communication between the two chambers, a freely displaceable ball adjacent said orifice for being seated thereon, a rocker arm coupled to said control member for displacement therewith for acting on said ball to directly control the position thereof relative to the orifice and thereby the pressure of the fluid in the working chamber, increased pressure of the fluid in the working chamber causing displacement of said other member until the pressure of the chamber reaches its original valve, a rod coupled to the control member and slidably engaging said jack body member, said rocker arm being carried by said rod and articulated on one side on one face of the piston member while its opposite side faces said ball, and a spring mounted on one of the faces of said rocker arm and which, in the position of rest of said device, tends to move the rocker arm sufficiently away from said ball for the latter to uncover said orifice.

2. A device as claimed in claim 1 further comprising a second spring mounted with pre-stress on the opposite faces of said rocker arm and acting so as to liberate the ball from its seated position covering the orifice if the pressure in the working chamber exceeds a predetermined value.

3. A device as claimed in claim 1 in which said jack body member is fixed while said piston member is coupled to the member to be actuated.

References Cited

UNITED STATES PATENTS

| | | | |
|---|---|---|---|
| 2,618,286 | 11/1952 | Johnson | 137—85 |
| 2,744,502 | 5/1956 | Frantz | 91—49 |
| 2,960,097 | 11/1960 | Scheffler | 137—85 |
| 3,237,633 | 3/1966 | Sanville | 137—82 |
| 2,407,013 | 9/1946 | Ifield | 91—47 |
| 2,958,503 | 11/1960 | Vaughn | 91—47 |
| 3,105,508 | 10/1963 | Bowditch et al. | 91—47 |
| 3,175,235 | 3/1965 | Randol | 91—376 |

PAUL E. MASLOUSKY, *Primary Examiner.*

U.S. Cl. X.R.

91—216, 376, 431